United States Patent
Burns et al.

(10) Patent No.: US 9,279,533 B2
(45) Date of Patent: Mar. 8, 2016

(54) REMOTE PIG LAUNCHER

(75) Inventors: Timothy Hamilton Burns, Richmond, TX (US); Charles Edward Higham Tyrrell, Houston, TX (US); John Michael Ward, Katy, TX (US)

(73) Assignee: Shell Oil Company, Houston, TX (US)

( * ) Notice: Subject to any disclaimer, the term of this patent is extended or adjusted under 35 U.S.C. 154(b) by 181 days.

(21) Appl. No.: 13/881,668

(22) PCT Filed: Oct. 28, 2011

(86) PCT No.: PCT/US2011/058307
§ 371 (c)(1),
(2), (4) Date: Apr. 25, 2013

(87) PCT Pub. No.: WO2012/058551
PCT Pub. Date: May 3, 2012

(65) Prior Publication Data
US 2013/0212820 A1    Aug. 22, 2013

Related U.S. Application Data

(60) Provisional application No. 61/408,023, filed on Oct. 29, 2010.

(51) Int. Cl.
*F16L 55/46* (2006.01)
*B08B 9/055* (2006.01)

(52) U.S. Cl.
CPC . *F16L 55/46* (2013.01); *B08B 9/055* (2013.01)

(58) Field of Classification Search
CPC .......... F16L 55/46; B08B 9/053; B08B 9/055
USPC ............... 15/3.5, 104.062; 137/268
See application file for complete search history.

(56) References Cited

U.S. PATENT DOCUMENTS

| | | | |
|---|---|---|---|
| 4,921,003 A | 5/1990 | Horvei | |
| 5,139,576 A | 8/1992 | Davis | |
| 5,170,524 A * | 12/1992 | Vowles | 15/3.51 |
| 6,139,644 A | 10/2000 | Lima | |
| 6,336,238 B1 * | 1/2002 | Tarlton | 15/3.5 |
| 6,454,011 B1 | 9/2002 | Schempf et al. | |
| 6,475,294 B2 | 11/2002 | McCanna et al. | |
| 7,530,398 B2 | 5/2009 | Balkanyi et al. | 166/344 |
| 7,918,283 B2 | 4/2011 | Balkanyi et al. | |
| 2002/0053354 A1 * | 5/2002 | McCanna et al. | 134/8 |
| 2002/0170599 A1 | 11/2002 | Disher et al. | |
| 2006/0048814 A1 * | 3/2006 | Albrecht et al. | 137/15.07 |
| 2009/0020288 A1 | 1/2009 | Balkanyi et al. | |
| 2009/0223672 A1 | 9/2009 | Naik | |
| 2009/0321077 A1 | 12/2009 | Norman | |

FOREIGN PATENT DOCUMENTS

| | | | |
|---|---|---|---|
| CN | 101566263 A | 10/2009 | |
| WO | WO2009133027 | 11/2009 | E21B 43/46 |

OTHER PUBLICATIONS

PCT International Search Report, Application No. PCT/US2011/058307 dated May 17, 2012.

* cited by examiner

*Primary Examiner* — Monica Carter
*Assistant Examiner* — Andrew A Horton

(57) ABSTRACT

A pig launching system comprising a first pipe portion connected to a second pipe portion at a pipe intersection; a pig carrier located at the pie intersection; and the pig carrier comprising a plurality of pigs in a cylinder, an opening in the carrier aligned with the first pipe portion, and an indexing system adapted to move one of the pigs to the opening.

8 Claims, 4 Drawing Sheets

REMOTE PIG LAUNCHER

PRIORITY CLAIM

The present application claims priority from PCT/US2011/058307, filed Oct. 28, 2011, which claims priority from U.S. provisional application 61/408,023, filed Oct. 29, 2010, which is incorporated herein by reference.

BACKGROUND OF INVENTION

1. Field of the Invention

Embodiments disclosed herein relate to a subsea pig handler system.

2. Background Art

PCT Patent Publication WO 2009/133027 discloses an apparatus and method of producing gaseous and liquid component streams from at least two multi-phase streams in at least two pipelines, the method comprising at least the steps of: (a) passing a first multi-phase stream along a first pipeline and through a first slugcatcher system; (b) passing a second multi-phase stream through a second pipeline and a second slugcatcher system, (c) passing a first pig down the first pipeline to create a first pig-slug mass in the first pipeline; and (d) passing at least a fraction of the first multi-phase stream upstream of the first pig-slug mass to the second pipeline along a crossover line. WO 2009/133027 is herein incorporated by reference in its entirety.

U.S. Pat. No. 7,530,398 discloses a system for assuring subsea hydrocarbon production flow in pipelines by chilling the hydrocarbon production flow in a heat exchanger and causing solids to form, periodically removing deposits and placing them in a slurry utilizing a closed loop pig launching and receiving systems. U.S. Pat. No. 7,530,398 is herein incorporated by reference in its entirety.

SUMMARY OF INVENTION

One aspect of the invention provides a pig launching system comprising a first pipe portion connected to a second pipe portion at a pipe intersection; a pig carrier located at the pipe intersection; and the pig carrier comprising a plurality of pigs in a cylinder, an opening in the carrier aligned with the first pipe portion, and an indexing system adapted to move one of the pigs to the opening.

DETAILED DESCRIPTION

In one aspect, embodiments disclosed herein relate to a system and method for remotely launching a pig from a pig launching system.

Fluids and gases produced from underground formations may be transported from the producing formation through a system of pipes to a storage area. Over time, the fluids and/or gases may leave contaminants in the pipelines which can build up into deposits. Deposits can be particularly problematic when they form within a heat exchanging portion of the pipeline because deposits can inhibit heat transfer across the heat exchanging portion of the pipeline. Thus, to prevent deposits from building up, a pig may be run through the heat exchanger periodically to clean the pipeline, thereby removing deposits and improving heat transfer.

In pipelines disposed in a subsea environment, it may be difficult to access and load the pig launcher. Because of the depth at which the pipelines are located, loading a pig into the pig launcher may be costly and time consuming. Thus, there is a need for a pig launcher capable of storing multiple pigs at a time, thereby reducing the number of trips needed to re-load the pig launcher.

FIG. 1

Figure 1:
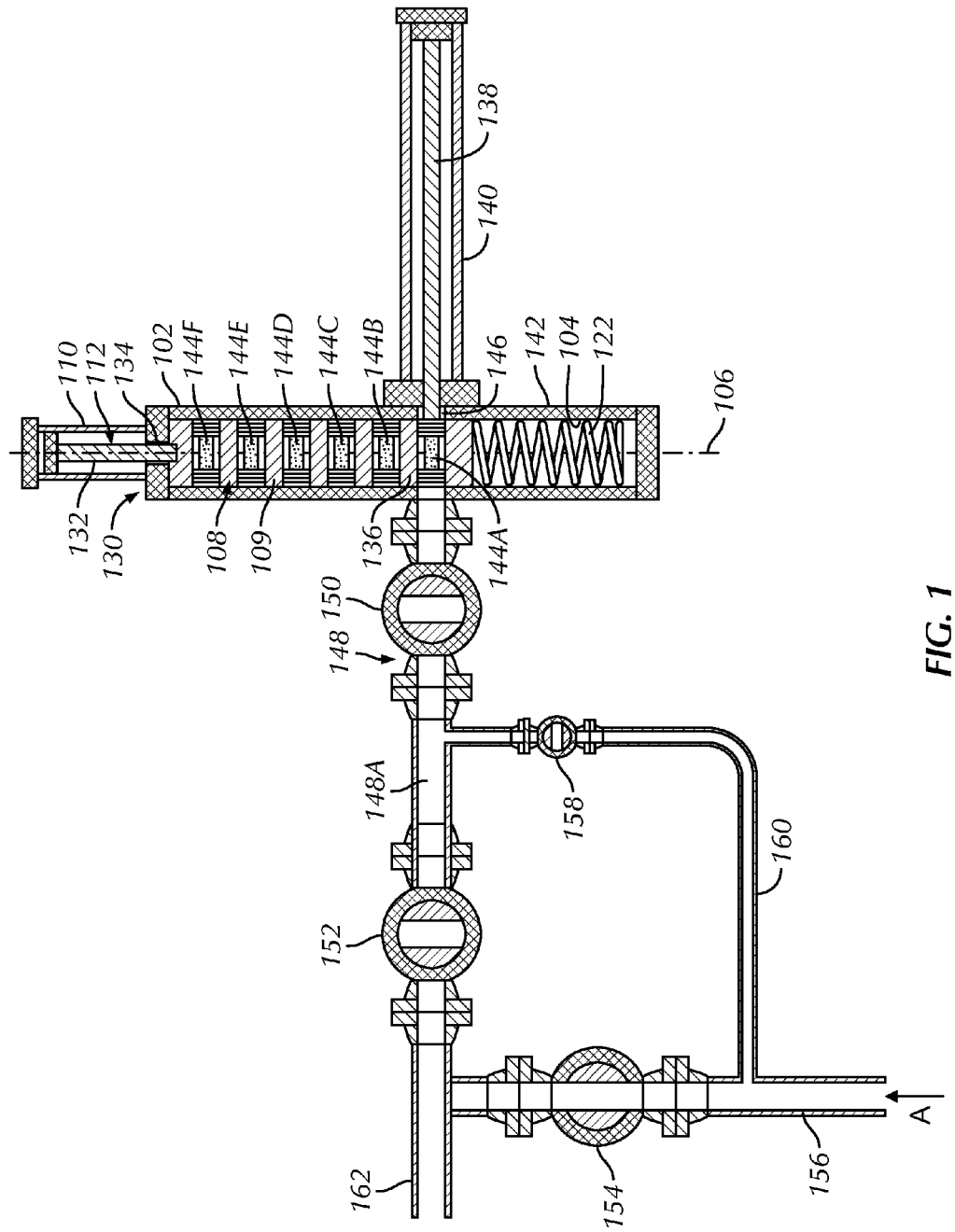
FIG. 1 shows a side cross-sectional view of an embodiment of a pig launching system in accordance with embodiments of the present disclosure.

Referring initially to FIG. 1, a pig launching system 100 in accordance with the present disclosure is shown. Pig launching system 100 may include a storage cylinder 102 having a storage chamber 104 disposed therein, sharing a longitudinal axis 106 of storage cylinder 102. Storage chamber 104 may be configured to store a pig carrier 108. In certain embodiments, a longitudinal axis of pig carrier 108 may be coaxial with longitudinal axis 106 of storage cylinder 102.

Figure 2A:
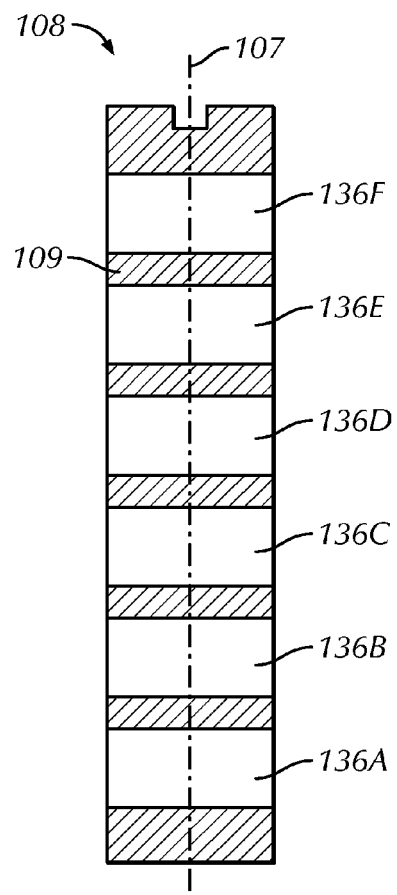
FIGS. 2A and 2B show a cross-sectional view and a side view of a pig carrier in accordance with embodiments of the present disclosure.
Figure 2B:
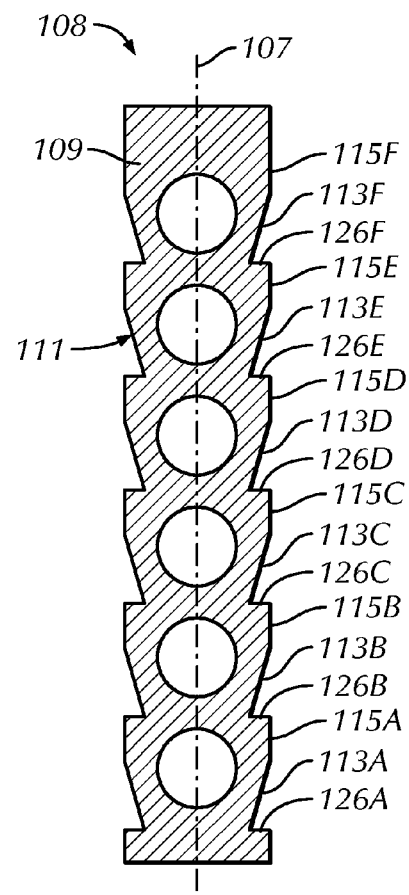

FIGS. 2a & 2b

Referring to FIGS. 2A and 2B, pig carrier 108 is shown having a body 109 and a longitudinal axis 107. A plurality of bores may be disposed radially through body 109 which may serve as pig chambers 136a-f. Each pig chamber 136a-f may be sized to hold a corresponding pig (not shown). Additionally, the size of pig chamber 136a-f and corresponding pigs (not shown) may be selected to fit a particular pipe system into which the pigs will be launched. Referring to FIG. 2B, sides 111 of body 109 include a plurality of radially inwardly tapered surfaces 113a-f disposed between a plurality of shoulders 126a-f. Additionally, a maximum outer diameter portion 115a-f may be disposed between shoulders 126a-f and tapered surfaces 113a-f, as shown. Shoulders 126a-f and tapered surfaces 113a-f interact with upper indexing piston arms 114 (FIG. 3B) and lower indexing piston arms 118 (FIG. 3B) to prevent upward movement of pig carrier 108 with respect to storage cylinder 102 (FIG. 3B), as will be discussed later in this disclosure.

Figure 3A:
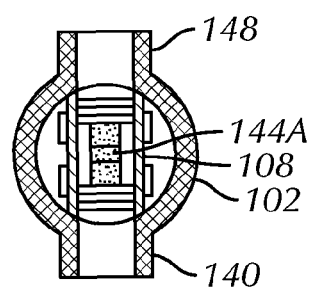
FIGS. 3A and 3B show a top cross-sectional view and a side cross-sectional view, respectively, of an embodiment of a pig launching system in accordance with the present disclosure.
Figure 3B:
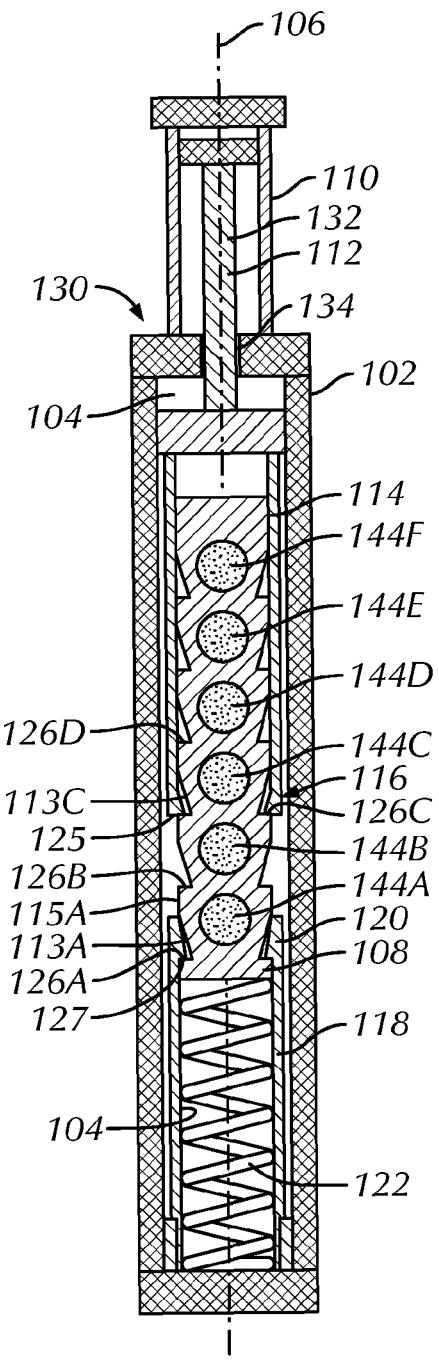

As shown in FIGS. 1 and 3B, an indexing cylinder 110 may be disposed adjacent an end of storage cylinder 102. Indexing cylinder 110 may be disposed adjacent to a top end 130 of storage cylinder 102; however, one of ordinary skill in the art will appreciate that, in an alternate embodiment, indexing cylinder 110 may be disposed on a bottom end of storage cylinder 102.

FIGS. 3A & 3B

Referring now to FIGS. 3A and 3B, top and side cross-sectional views, respectively, of a storage cylinder 102 are shown, the cross-sectional view of FIG. 3B being approximately 90 degrees rotated about longitudinal axis 106 from the cross-sectional view shown in FIG. 1. Indexing cylinder 110 may include an indexing piston 112 disposed therein, having a piston rod 132 extending through an opening 134 in a top end 130 of storage cylinder 102, and into storage chamber 104. Indexing piston 112 may include upper indexing piston arms 114 including upper indexing grips 116 disposed on a lower end thereof. Upper indexing piston arms 114 may be integrally formed with indexing piston 112, or alternatively, upper indexing piston arms 114 may be coupled to indexing piston 112 using, for example, welding, mechanical fasteners, and/or adhesives. Additionally, upper indexing piston arms 114 preferably do not contact a portion of pig carrier 108 through which pig chambers 136 extend, so as to keep from blocking pigs 144 during a launch.

Upper indexing grips 116 may include a tapered surface that extends radially inward toward longitudinal axis 106. A shoulder 125 of upper indexing grips 116 may be configured to engage one of shoulders 126a-f disposed on pig carrier 108. Engagement between shoulders 125 of upper indexing grips 116 and one of shoulders 126a-f of pig carrier 108 allows for a downward force provided by indexing piston 112 to be transferred to pig carrier 108, thereby moving pig carrier 108 downward with respect to storage cylinder 102.

Lower indexing arms 118 having lower indexing grips 120 may be disposed in a lower portion of storage chamber 104. In certain embodiments, lower indexing arms 118 may be disposed on a bottom surface of storage chamber 104, as shown. Lower indexing grips 120 may be positioned on a top portion of lower indexing arms 118, extending upward toward pig carrier 108. Lower indexing grips 120 may include a tapered profile ending in a lower shoulder 127 disposed below the tapered surface and extending in a radial inward direction. Lower shoulder 127 on lower indexing grips 120 may be configured to engage shoulder 126 of pig carrier 108, and contact between shoulder 126 of pig carrier 108 and lower shoulder 127 on lower indexing grips 120 may prevent upward movement of pig carrier 108 with respect to lower indexing grips 120.

During operation, indexing piston 112 may be moved downward such that shoulder 125 of upper indexing grips 116 contacts, for example, shoulder 126c of pig carrier 108, thereby moving pig carrier 108 in a downward direction. In certain embodiments, the lower end of pig carrier 108 may move downward into contact with compressible element 122. Compressible element 122 may include, for example, a spring or a bladder, and may be designed to resist compression, thereby providing an upward force on pig carrier 108. The upward force on pig carrier 108 may allow contact between shoulder 126a and lower shoulder 127 to be maintained so that downward slipping of pig carrier 108 is prevented.

As pig carrier 108 is pushed downwardly by upper indexing grips 116 through contact between shoulder 125 of upper indexing piston 112 and shoulder 126c of pig carrier 108, a lower portion of pig carrier 108 may engage a tapered surface of lower indexing grips 120. As pig carrier 108 continues to move downwardly along the tapered surface of lower indexing grips 120, contact between lower indexing grips 120 and maximum diameter portions 115a-f occurs. To allow maximum diameter portions 115a-f through lower indexing grips 120, lower indexing arms 118 may flex slightly in a radially outward direction. Lower indexing arms 118 may return to their upright position when maximum diameter portions 115a-f move past lower indexing grips 120, thereby engaging subsequent shoulders 126a-f.

Figure 4:
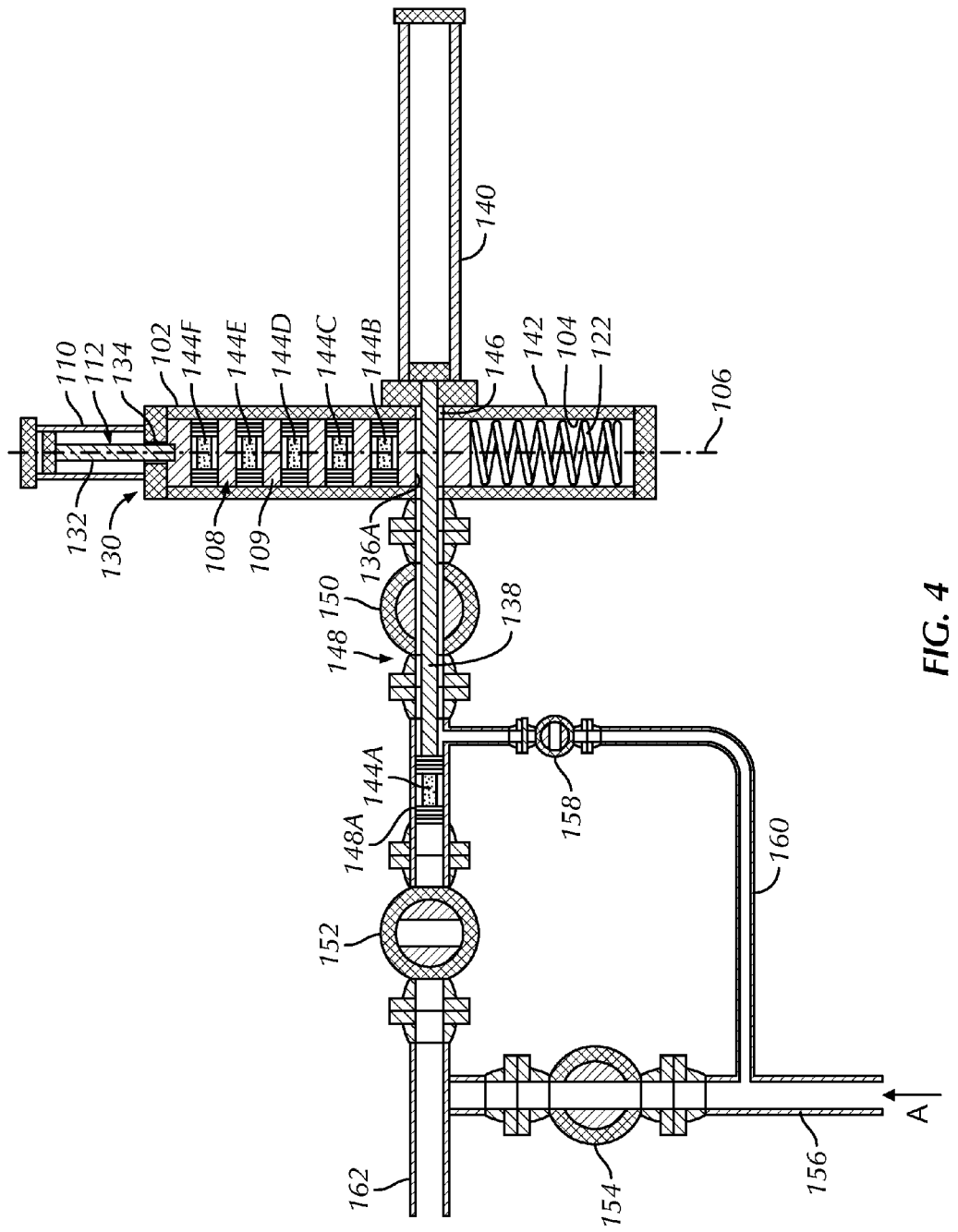
FIG. 4 shows a side cross-sectional view of an embodiment of a pig launching system in accordance with embodiments of the present disclosure.

Referring to FIGS. 1, 3B, and 4 together, pig carrier 108 and lower indexing grips 120 may be designed such that, when one of shoulders 126a-f of pig carrier 108 engages shoulder 127 of lower indexing grips 120, a pig chamber 136a-f and corresponding pig 144a-f is aligned with a launching piston 138 disposed in a launching cylinder 140. For example, when shoulder 126a of pig carrier 108 engages lower shoulder 127, pig 144a disposed in pig chamber 136a may be aligned with launching piston 138. Launching piston 138 may extend through a side wall 142 (FIG. 1) of storage cylinder 102 and into contact with a pig 144a disposed in pig chamber 136a. Launching piston 138 may push pig 144a out of pig chamber 136a and through an opening 146 in storage chamber 102 into a conduit 148 connected to storage cylinder 102. In certain embodiments, conduit 148 may provide a passageway between storage cylinder 102 and a subsea production line into which pigs 144a-f may be launched.

FIG. 4

Referring to FIG. 4, a clip valve 150 may open to allow pig 144a to be pushed therethrough by launcher piston 138. After launcher piston 138 is retracted, clip valve 150 may be closed. A launcher valve 152 may also be disposed in conduit 148 further from storage cylinder 102 than clip valve 150. In certain embodiments, clip valve 150 and launcher valve 152 may be closed with pig 144a disposed in a conduit section 148a therebetween. To launch pig 144a from conduit section 148a, a bypass valve 154 disposed in a second conduit 156 may be closed, and a kicker valve 158 disposed in a third conduit 160, fluidly connected between conduit section 148a and second conduit 156, may be opened. In such a configuration, fluid flow from a pipeline (not shown) entering second conduit 156, indicated by arrow A, may be diverted into third conduit 160, through open kicker valve 158, and into conduit section 148a. Over time, a fluid pressure may build up within conduit section 148a behind pig 144a. Pig 144a may be launched into a pipeline 162 by opening launcher valve 152 and releasing the built up fluid pressure behind pig 144a.

Referring to FIGS. 4 and 3B, pig carrier 108 may be reset after pig 144a is launched so that a subsequent pig 144b may be aligned with launcher piston 138 in preparation for a second launch. To reset pig carrier 108, indexing piston 112 may be moved upward with respect to pig carrier 108 as lower indexing grips 120 hold pig carrier 108 stationary with respect to storage cylinder 102. During resetting, upper indexing grips 116 may move along tapered surface 113c of pig carrier 108 until shoulder 125 of upper indexing grips 116 reaches a subsequent shoulder 126d of pig carrier 108. Once shoulders 125 of upper indexing arms 114 engage shoulders 126d of pig holder 108, indexing piston 112 may be moved downward, thereby causing tapered surface 113a and maximum diameter portion 115a of pig carrier 108 to move downwardly past lower shoulder 127 of lower indexing arms 118 until shoulder 126b of pig carrier 108 engages lower shoulder 127. Those of ordinary skill in the art will appreciate that this motion may be used multiple times to move pigs 144a-f into alignment with launcher piston 138.

After all of the pigs 144a-f have been launched from pig carrier 108, pig carrier 108 may be restocked with pigs for future launching.

Illustrative Embodiments

In one embodiment, there is disclosed a pig launching system comprising a first pipe portion connected to a second pipe portion at a pipe intersection; a pig carrier located at the pie intersection; and the pig carrier comprising a plurality of pigs in a cylinder, an opening in the carrier aligned with the first pipe portion, and an indexing system adapted to move one of the pigs to the opening. In some embodiments, the system also includes a body carrying the plurality of pigs, the body moveable within the cylinder. In some embodiments, the indexing system comprises at least one indexing arm adapted to engage with a shoulder surface on the body. In some embodiments, the system also includes a piston adapted to move the pigs into alignment with the opening. In some embodiments, the system also includes a launcher piston adapted to move one of the pigs from the opening into the first pipe portion. In some embodiments, the system also includes a third pipe portion connecting the first pipe portion and the second pipe portion, wherein a flow through the second pipe portion can be diverted through the third pipe portion and a pressure differential used to force a pig into the first pipe portion.

Advantageously, embodiments disclosed herein provide for a pig launcher which may be installed in a subsea pipeline. A pig launcher in accordance with the present disclosure may allow for multiple pigs to be launched into a pipeline without requiring the pig launcher to be reloaded for each launch. As such, embodiments of the present disclosure may provide cost and time savings by decreasing the number of times the pig launcher is reloaded.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A pig launching system comprising:
   a storage cylinder having a storage chamber disposed therein, wherein the storage chamber comprises lower indexing piston arms;
   a pig carrier disposed within the storage chamber, the pig carrier comprising a body having a plurality of bores disposed radially through the body and sides comprising a plurality of radially inwardly tapered surfaces disposed between a plurality of shoulders;
   an indexing cylinder comprising an indexing piston disposed therein, wherein the indexing piston extends through an opening of a top end of the storage cylinder and wherein the indexing piston comprises upper indexing piston arms.

2. The pig launching system of claim 1, wherein the sides comprise a plurality of maximum diameter portions disposed between the shoulders and the tapered surfaces.

3. The pig launching system of claim 1, wherein the pig carrier comprises a plurality of pigs positioned radially in the plurality of bores.

4. The pig launching system of claim 1, wherein the indexing piston comprises upper indexing grips and lower indexing grips.

5. The pig launching system of claim 4, wherein the upper indexing grips are configured to engage one of the plurality of shoulders of the pig carrier.

6. The pig launching system of claim 4, wherein the lower indexing grips are configured to engage one of the plurality of shoulders of the pig carrier.

7. The pig launching system of claim 1, further comprising a compressible element contacting a lower end of the pig carrier.

8. The pig launching system of claim 1, further comprising a launching piston extending through a side wall of the storage cylinder.

* * * * *